US012640773B2

(12) United States Patent
Wei et al.

(10) Patent No.: US 12,640,773 B2
(45) Date of Patent: May 26, 2026

(54) FREQUENCY HOPPING PATTERN INDICATION METHOD AND APPARATUS

(71) Applicant: HUAWEI TECHNOLOGIES CO., LTD., Guangdong (CN)

(72) Inventors: Fan Wei, Shenzhen (CN); Lei Wang, Shanghai (CN); Xiuqiang Xu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 8 days.

(21) Appl. No.: 18/601,463

(22) Filed: Mar. 11, 2024

(65) Prior Publication Data

US 2024/0250712 A1    Jul. 25, 2024

Related U.S. Application Data

(63) Continuation of application No. PCT/CN2022/118257, filed on Sep. 9, 2022.

(30) Foreign Application Priority Data

Sep. 13, 2021    (CN) .......................... 202111070717.X

(51) Int. Cl.
    H04B 1/69        (2011.01)
    H04B 1/707        (2011.01)
    (Continued)

(52) U.S. Cl.
    CPC ................................. H04B 1/7143 (2013.01)

(58) Field of Classification Search
    CPC ................ H04B 1/7143; H04B 7/0626; H04B 17/336
    (Continued)

(56) References Cited

U.S. PATENT DOCUMENTS

| | | | | |
|---|---|---|---|---|
| 11,509,350 | B2 * | 11/2022 | Pezeshki | .............. H04B 1/7143 |
| 2010/0110929 | A1 | 5/2010 | Li et al. | |
| 2019/0059081 | A1 * | 2/2019 | Medles | ................ H04B 1/7143 |

FOREIGN PATENT DOCUMENTS

| | | |
|---|---|---|
| CN | 101222268 A | 7/2008 |
| CN | 108365927 A | 8/2018 |

(Continued)

OTHER PUBLICATIONS

Huawei, HiSilicon:"Support of URLLC in UL." 3GPP TSG RAN WG1 NR Ad Hoc Meeting, Spokane, Washington, USA, Jan. 16-20, 2017. R1-1700024, total 16 pages.

(Continued)

*Primary Examiner* — Phuong Phu

(57)    ABSTRACT

A frequency hopping pattern indication method and an apparatus are provided to reduce interference between users. In the method, a network device may indicate a frequency hopping pattern to a first terminal device which performs communication based on the frequency hopping pattern. The frequency hopping pattern indicates a frequency band occupied when the first terminal device performs communication at a frequency hopping moment. The first terminal device collides with any other terminal device at a maximum of one frequency hopping moment in one period. A first period corresponds to more than two frequency hopping moments and more than two frequency bands.

15 Claims, 5 Drawing Sheets

S201

A first terminal device obtains first indication information

S202

The first terminal device performs communication based on a frequency hopping pattern indicated by the first indication information

(51) Int. Cl.
    *H04B 1/713*       (2011.01)
    *H04B 1/7143*     (2011.01)

(58) Field of Classification Search
    USPC ................................................. 375/132–137
    See application file for complete search history.

(56)               References Cited

FOREIGN PATENT DOCUMENTS

| | | | |
|---|---|---|---|
| CN | 108768448 | A | 11/2018 |
| WO | 2016138643 | A1 | 9/2016 |
| WO | 2018160125 | A1 | 9/2018 |

OTHER PUBLICATIONS

3rd Generation Partnership Project; Technical Specification Group Radio Access Network; NR; Physical layer procedures for data (Release 16), 3GPP TS 38.214 V16.6.0 (Jun. 2021), Technical Specification, total 172 pages.

Huawei, HiSilicon:"Enhanced UL configured grant transmissions", 3GPP TSG RAN WG1 Meeting #96, Athens, Greece, Feb. 25 Mar. 1, 2019, R1-1901562, total 16 pages.

* cited by examiner

S201

A first terminal device obtains first indication information

S202

The first terminal device performs communication based on a frequency hopping pattern indicated by the first indication information

FREQUENCY HOPPING PATTERN INDICATION METHOD AND APPARATUS

CROSS-REFERENCE TO RELATED APPLICATIONS

This filing is a continuation of International Application No. PCT/CN2022/118257 filed on Sep. 9, 2022, which claims priority to Chinese Patent Application No. 202111070717.X filed on Sep. 13, 2021. The disclosures of the aforementioned applications are hereby incorporated by reference in their entireties.

TECHNICAL FIELD

Disclosed embodiments relate to the field of wireless communication technologies, and in particular, to a frequency hopping pattern indication method and an apparatus.

BACKGROUND

With continuous popularization of disclosures such as the Internet of Things, the number of users accessing a network increases exponentially. Under a background in which communication resources such as a spectrum are limited, a non-orthogonal multiple access manner needs to be considered, that is, multiple users share same resources such as a time domain resource, a frequency domain resource, and a space domain resource in a communication process. In non-orthogonal multiple access, because users share common communication resources, to resolve a problem of interference between a plurality of users, a frequency hopping mechanism may be introduced in a communication system. The users randomly select different frequency bands in each transmission, to randomize interference between the users. This resolves a problem of multiple access interference in non-orthogonal multiple access.

Currently, in the $3^{rd}$ generation partnership project (3GPP) protocol, when a frequency hopping pattern is designed, there are only two frequency hopping moments in the time domain, and there are only two frequencies in the frequency domain. When a large number of users access a network, there are still a large number of interfering users on each frequency band, and interference between users is strong.

SUMMARY

The disclosure provides a frequency hopping pattern indication method and an apparatus, to reduce interference between users.

According to a first aspect, a frequency hopping pattern indication method is provided. In the method, a first terminal device obtains first indication information, where the first indication information indicates a frequency hopping pattern, and the first terminal device performs communication based on the frequency hopping pattern.

The first indication information may indicate one or more frequency hopping patterns. When the first indication information indicates one frequency hopping pattern, the first terminal device performs communication based on the frequency hopping pattern. When the first indication information indicates a plurality of frequency hopping patterns (for example, including a first frequency hopping pattern and a second frequency hopping pattern), the first terminal device selects one frequency hopping pattern (for example, selects the first frequency hopping pattern or selects the second frequency hopping pattern) from the plurality of frequency hopping patterns for communication.

The first terminal device may obtain the first indication information from a network device, or the first terminal device may obtain the first indication information from the first terminal device.

The frequency hopping pattern indicates a frequency band occupied when the first terminal device performs communication at a frequency hopping moment. The first terminal device collides with any other terminal device at a maximum of one frequency hopping moment in one period. In other words, a maximum quantity of times that the first terminal device collides with any other terminal device in one period is 1. Therefore, in the method, a quantity of times of collisions between users can be as small as possible by using indication and design of a frequency hopping pattern. This reduces interference between the users.

That two terminal devices collide with each other means that the two terminal devices select a same frequency band at a same frequency hopping moment.

In the method, one period corresponds to more than two frequency hopping moments and more than two frequency bands. A period may be a length of a cyclic section of a frequency hopping sequence. In a possible manner, the length of a cycle section of a frequency hopping sequence may be determined based on a supported maximum quantity of frequency hopping moments. In another possible manner, the length of a cycle section of a frequency hopping sequence may be determined based on a quantity of supported frequency bands.

For example, the first terminal device may communicate with a network device based on a frequency hopping pattern. If the first indication information indicates a plurality of frequency hopping patterns, the network device may attempt to receive, on frequency bands corresponding to the plurality of frequency hopping patterns, information sent by the first terminal device.

In a possible design, that the first terminal device collides with any other terminal device at a maximum of one frequency hopping moment in one period may be implemented by using a property of Euclidean space. Points in the Euclidean space correspond to the terminal devices. For example, in Euclidean space, each frequency hopping moment corresponds to a parallel line cluster, the parallel line cluster includes a plurality of line segments that are parallel to each other, each frequency band corresponds to (one or more) line segments, each line segment includes a plurality of points, and terminal devices correspond to (one or more) points. Because any two line segments in the Euclidean space have only two location relationships: intersection and parallel, and intersection line segments have only one corner point, a quantity of times of collisions between any two terminal devices in one period may not exceed 1.

In a possible design, the frequency hopping pattern or a frequency hopping pattern set including the frequency hopping pattern is specified in the 3GPP protocol.

In a possible design, the frequency hopping pattern or a frequency hopping pattern set including the frequency hopping pattern is generated by the network device.

Optionally, the first terminal device may receive the frequency hopping pattern or the frequency hopping pattern set from the network device.

In a possible design, the frequency hopping pattern or a frequency hopping pattern set including the frequency hopping pattern is generated by a terminal device.

The first terminal device may obtain a first parameter and a second parameter and generate a frequency hopping pattern set based on the first parameter and the second parameter. The frequency hopping pattern set includes the frequency hopping pattern (namely, the frequency hopping pattern indicated by the first indication information).

Specifically, when generating the frequency hopping pattern based on the first parameter and the second parameter, the first terminal device determines a primitive polynomial corresponding to the first parameter and the second parameter, where the primitive polynomial is used to generate a first representation form and a second representation form, determines, based on the first representation form, a first line segment that passes through an origin and that is in a first parallel line cluster corresponding to a second frequency hopping moment and in each frequency hopping pattern, determines, based on the first representation form, the second representation form, and the first line segment in each frequency hopping pattern, all second line segments that are in each first parallel line cluster and parallel to the first line segment, and determines each frequency hopping pattern in the frequency hopping pattern set based on a mapping relationship between the first line segment, the second line segment, and points in each first parallel line cluster.

The first parameter is related to a Euclidean space dimension, and the second parameter is related to a quantity of points in the Euclidean space. Points on the first line segment represent terminal devices on a frequency band corresponding to the first line segment, namely, terminal devices that may occupy the frequency band corresponding to the first line segment. Points on the second line segment represent terminal devices on a frequency band corresponding to the second line segment.

Optionally, the parameters required for generating the frequency hopping pattern by the terminal device may be sent by the network device. For example, the network device sends second indication information to the first terminal device, where the second indication information includes the first parameter and the second parameter. The second indication information may further include one or more of the following information: the primitive polynomial, a frequency hopping moment set (including the second frequency hopping moment), a correspondence between terminal devices in a network and points in Euclidean space, or the like.

Optionally, the terminal device may send the generated frequency hopping pattern or frequency hopping pattern set to the network device.

In a possible design, the first indication information may include identification information of the frequency hopping pattern.

The identification information of the frequency hopping pattern may be a number of the frequency hopping pattern in the frequency hopping pattern set.

Alternatively, the identification information of the frequency hopping pattern may include a signature sequence, and a frequency band granularity of the signature sequence may be of a resource block level or a resource element level.

In a possible design, the first indication information may include a frequency hopping pattern, that is, the first indication information may indicate the frequency hopping pattern.

In a possible design, when the first terminal device performs communication based on the frequency hopping pattern, at a first frequency hopping moment, the first terminal device may perform communication by using a first frequency band that corresponds to the first frequency hopping moment and that is in the frequency hopping pattern.

The first frequency band is a frequency band that is occupied by the first terminal device at the first frequency hopping moment and that is in the frequency hopping pattern.

According to a second aspect, a frequency hopping pattern indication method is provided. In the method, the network device sends first indication information, where the first indication information indicates a frequency hopping pattern; and the network device performs communication based on the frequency hopping pattern, where the frequency hopping pattern indicates a frequency band occupied when a first terminal device performs communication at a frequency hopping moment, the first terminal device collides with any other terminal device at a maximum of one moment in one period, and the period corresponds to more than two frequency hopping moments and more than two frequency bands.

For example, the network device communicates with a terminal device (for example, the first terminal device) based on the frequency hopping pattern.

In a possible design, that the first terminal device collides with any other terminal device at a maximum of one frequency hopping moment in one period includes: In Euclidean space, each frequency hopping moment corresponds to a parallel line cluster, the parallel line cluster includes a plurality of line segments that are parallel to each other, each frequency band corresponds to the line segment, each line segment includes a plurality of points, and terminal devices correspond to the points.

In a possible design, the frequency hopping pattern or a frequency hopping pattern set including the frequency hopping pattern is specified in the 3GPP protocol.

In a possible design, the frequency hopping pattern or a frequency hopping pattern set including the frequency hopping pattern is generated by the network device.

The network device may obtain a first parameter and a second parameter, and generate a frequency hopping pattern set based on the first parameter and the second parameter. The frequency hopping pattern set includes the frequency hopping pattern (namely, the frequency hopping pattern indicated by the first indication information).

Specifically, when generating the frequency hopping pattern based on the first parameter and the second parameter, the network device determines a primitive polynomial corresponding to the first parameter and the second parameter, where the primitive polynomial is used to generate a first representation form and a second representation form, determines, based on the first representation form, a first line segment that passes through an origin and that is in a first parallel line cluster corresponding to a second frequency hopping moment and in each frequency hopping pattern, determines, based on the first representation form, the second representation form, and the first line segment in each frequency hopping pattern, all second line segments that are in each first parallel line cluster and parallel to the first line segment, and determines each frequency hopping pattern in the frequency hopping pattern set based on a mapping relationship between the first line segment, the second line segment, and points in each first parallel line cluster.

The first parameter is related to a Euclidean space dimension, and the second parameter is related to a quantity of points in the Euclidean space. Points on the first line segment represent terminal devices on a frequency band corresponding to the first line segment, namely, terminal devices that may occupy the frequency band corresponding to the first line segment. Points on the second line segment represent terminal devices on a frequency band corresponding to the second line segment.

Optionally, the network device may send the frequency hopping pattern or the frequency hopping pattern set to the first terminal device.

In a possible design, the frequency hopping pattern or a frequency hopping pattern set including the frequency hopping pattern is generated by a terminal device.

Optionally, the network device may send, to the terminal device, a parameter used to generate the frequency hopping pattern. For example, the network device sends second indication information to the terminal device, and the second indication information includes one or more of the following information: the first parameter, the second parameter, the primitive polynomial, a frequency hopping moment set (including the second frequency hopping moment), a correspondence between terminal devices in a network and points in Euclidean space, or the like.

Optionally, the network device may receive a frequency hopping pattern or a frequency hopping pattern set from the terminal device.

In a possible design, the first indication information may include identification information of the frequency hopping pattern.

The identification information of the frequency hopping pattern may be a number of the frequency hopping pattern in the frequency hopping pattern set.

Alternatively, the identification information of the frequency hopping pattern may include a signature sequence, and a frequency band granularity of the signature sequence may be of a resource block level or a resource element level.

In a possible design, the first indication information may include a frequency hopping pattern, that is, the first indication information may indicate the frequency hopping pattern.

In a possible design, when the network device performs communication based on the frequency hopping pattern, at a first frequency hopping moment, the network device may perform communication by using a first frequency band that corresponds to the first frequency hopping moment and that is in the frequency hopping pattern.

According to a third aspect, a communication apparatus is provided. The communication apparatus may be the foregoing terminal device or network device or may be a chip disposed in the terminal device or the network device. The communication apparatus may implement the method according to the first aspect or the second aspect.

The communication apparatus includes a corresponding module, unit, or means for implementing the foregoing method. The module, unit, or means may be implemented by using hardware or software or implemented by using hardware by executing corresponding software. The hardware or the software includes one or more modules or units corresponding to the foregoing functions.

According to a fourth aspect, a communication apparatus is provided, and includes a transceiver unit. Optionally, the communication apparatus further includes a processing unit. The communication apparatus may implement the method according to the first aspect or the second aspect.

According to a fifth aspect, a communication apparatus is provided, and includes a processor. The processor is coupled to or decoupled from a memory, and may be configured to execute instructions in the memory, so that the apparatus performs the method according to the first aspect or the second aspect. Optionally, the apparatus further includes the memory. Optionally, the apparatus further includes an interface circuit, and the processor is coupled to the interface circuit.

The interface circuit may be a code/data read/write interface circuit, and the interface circuit is configured to: receive computer-executable instructions (the computer-executable instructions are stored in the memory, and may be directly read from the memory, or may pass through another component), and transmit the computer-executable instructions to the processor, so that the processor runs the computer-executable instruction to perform the method according to any one of the foregoing aspects.

In some possible designs, the communication apparatus may be a chip or a chip system.

According to a sixth aspect, a communication apparatus is provided, and includes a processor and a memory. The processor is configured to read instructions stored in the memory, may receive a signal by using a receiver, and transmits a signal by using a transmitter, to perform the method according to the first aspect or the second aspect.

Optionally, there are one or more processors, and there are one or more memories.

Optionally, the memory may be integrated with the processor, or the memory and the processor are disposed separately.

In a specific implementation process, the memory may be a non-transitory memory, like a read only memory (ROM). The memory and the processor may be integrated into a same chip, or may be separately disposed on different chips. A type of the memory and a manner in which the memory and the processor are disposed are not limited in embodiments.

The communication apparatus may be a chip, and the processor may be implemented by using hardware, or may be implemented by using software. When the processor is implemented by using hardware, the processor may be a logic circuit, an integrated circuit, or the like. When the processor is implemented by using software, the processor may be a general-purpose processor, and is implemented by reading software code stored in the memory. The memory may be integrated in the processor or may be located outside the processor and exist independently.

According to a seventh aspect, a processor is provided, and includes an input circuit, an output circuit, and a processing circuit. The processing circuit is configured to: receive a signal through the input circuit, and transmit a signal through the output circuit, so that the processor performs the method according to the first aspect or the second aspect.

In a specific implementation process, the processor may be a chip, the input circuit may be an input pin, the output circuit may be an output pin, and the processing circuit may be a transistor, a gate circuit, a trigger, various logic circuits, or the like. An input signal received by the input circuit may be received and input by, for example, but not limited to, a receiver, a signal output by the output circuit may be output to, for example, but not limited to, a transmitter and transmitted by the transmitter, and the input circuit and the output circuit may be a same circuit, where the circuit is used as the input circuit and the output circuit at different moments. Specific implementations of the processor and various circuits are not limited in embodiments.

According to an eighth aspect, a communication apparatus is provided, including a logic circuit and an input/output interface, where the input/output interface is configured to communicate with a module outside the communication apparatus; and the logic circuit is configured to run a computer program to perform the method according to any one of the foregoing aspects. The communication apparatus may be the terminal device or the network device in the first aspect or the second aspect, or an apparatus including the terminal device or the network device, or an apparatus included in the terminal device or the network device, for example, a chip.

Alternatively, the input/output interface may be a code/data read/write interface circuit, and the input/output interface is configured to: receive a computer program (the computer program is stored in a memory, and may be directly read from the memory, or may pass through another component), and transmit the computer program to the input/output interface, so that the input/output interface runs the computer program to perform the method according to any one of the foregoing aspects.

Optionally, the communication apparatus may be a chip.

According to a ninth aspect, a computer program product is provided. The computer program product includes a computer program (which may also be referred to as code or instructions), and when the computer program is run, a computer is enabled to perform the method according to the first aspect or the second aspect.

According to a tenth aspect, a computer-readable medium is provided. The computer-readable medium stores a computer program (which may also be referred to as code or instructions). When the computer program is run on a computer, the computer is enabled to perform the method according to the first aspect or the second aspect.

According to an eleventh aspect, a chip system is provided. The chip system includes a processor and an interface and is configured to support a communication apparatus in implementing the function in the first aspect or the second aspect. In a possible design, the chip system further includes a memory. The memory is configured to store necessary information and data of the foregoing communication apparatus. The chip system may include a chip or may include a chip and another discrete component.

According to a twelfth aspect, a function entity is provided. The function entity is configured to implement the methods in the first aspect and the second aspect.

According to a thirteenth aspect, a communication system is provided, including the terminal device and the network device in the first aspect or the second aspect.

For technical effects brought by any design of the third aspect to the thirteenth aspect, refer to the technical effects brought by the first aspect. Details are not described herein again.

DESCRIPTION OF EMBODIMENTS

Figures 1, 2:
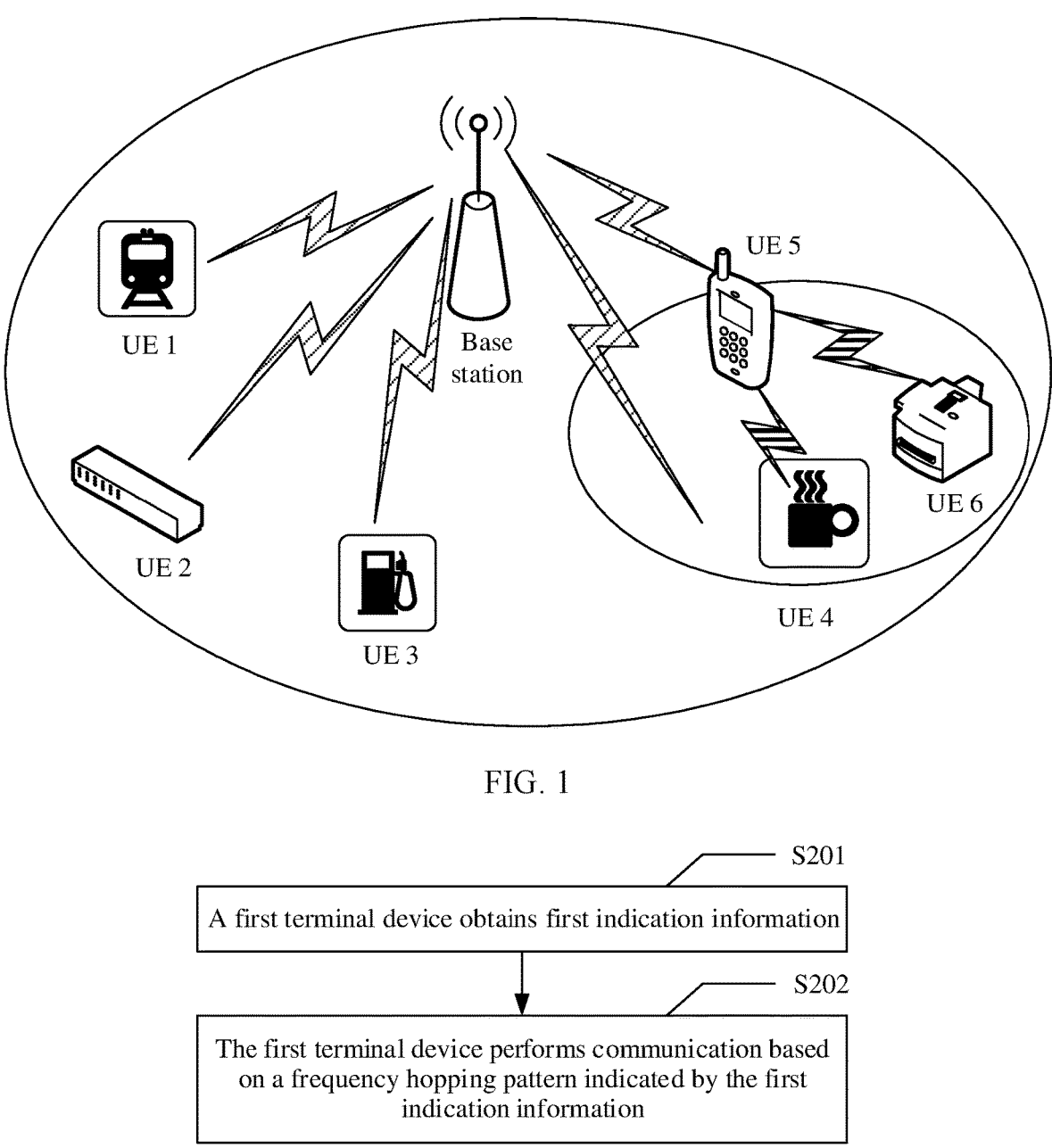
FIG. 1 is a schematic diagram of an architecture of a communication system.
FIG. 2 is a schematic diagram of a frequency hopping pattern indication process according to an embodiment of the disclosure.

The following describes technical solutions with reference to accompanying drawings.

All aspects, embodiments, or features are presented in the disclosure by describing a system that may include a plurality of devices, components, modules, and the like. It should be appreciated and understood that each system may include another device, component, module, and the like, and/or may not include all devices, components, modules, and the like discussed with reference to the accompanying drawings. In addition, a combination of these solutions may be used.

In addition, the term "example" in embodiments of the disclosure is used to represent giving an example, an illustration, or a description. Any embodiment or design scheme described as an "example" in the disclosure should not be explained as being more preferred or having more advantages than another embodiment or design scheme. The term "example" is used to present a concept in a specific manner.

The network architecture and the service scenario described in embodiments are intended to describe the technical solutions in embodiments more clearly, and do not constitute a limitation on the technical solutions provided in the disclosed embodiments. A person of ordinary skill in the art may know that: With the evolution of the network architecture and the emergence of new service scenarios, the technical solutions provided in the disclosed embodiments are also applicable to similar technical problems.

The following describes some terms in the disclosed embodiments to facilitate understanding of a person skilled in the art.

(1) A communication system to which embodiments are applied may be various communication systems and may be an internet of things (IoT), a narrow band internet of things (NB-IoT), a 4G system, long term evolution (LTE), an LTE frequency division duplex (FDD) system, an LTE time division duplex (TDD) system, or a 5th generation (5G) communication system. Alternatively, the communication system may be an LTE and 5G hybrid architecture, or may be a 5G NR system or a new communication system that appears in future communication development, like 6G. The 5G communication system in embodiments may include at least one of a non-standalone (NSA) 5G communication system and a standalone (SA) 5G communication system. The communication system may alternatively be a public land mobile network (PLMN) network, a device-to-device (D2D) network, a machine to machine (M2M) network, or another network. In addition, the communication system may also include a satellite communication system, a communication system in which the foregoing communication system and the satellite communication system are mixed, or the like.

(1) User equipment (UE), also referred to as a terminal device, is a device having a wireless transceiver function, and may communicate with one or more core network (CN) devices through an access network device in a radio access network (RAN).

The user equipment may also be referred to as an access terminal, a terminal, a subscriber unit, a subscriber station, a mobile station, a mobile console, a remote station, a remote terminal, a mobile device, a user terminal, a user agent, a user apparatus, or the like. The user equipment may be deployed on land, and include indoor user equipment, outdoor user equipment, handheld user equipment, or vehicle-mounted user equipment; or may be deployed on a water surface (for example, on a ship); or may be deployed in the air (for example, on an aircraft, a balloon, or a satellite). The user equipment may be a cellular phone, a cordless phone, a session initiation protocol (SIP) phone, a smartphone, a mobile phone, a wireless local loop (WLL) station, a personal digital assistant (PDA), or the like. Alternatively, the user equipment may be a handheld device or a computing device having a wireless communication function, another device connected to a wireless modem, a vehicle-mounted device, a wearable device, an unmanned aerial vehicle device, a terminal in an internet of things or an internet of vehicles, a terminal of any form in a 5G network or a future network, relay user equipment, a terminal in a future evolved public land mobile network (PLMN), or the like. The relay user equipment may be, for example, a 5G residential gateway (RG). For example, the user equipment may be a virtual reality (VR) terminal, an augmented reality (AR) terminal, a wireless terminal in industrial control, a wireless terminal in self-driving, a wireless terminal in telemedicine (remote medical), a wireless terminal in a smart grid, a wireless terminal in transportation safety, a wireless terminal in a smart city, a wireless terminal in a smart home, or the like. A type, a category, or the like of the terminal device is not limited in embodiments.

(2) A network device is a device that can provide a wireless access function for a terminal. The network device may support at least one wireless communication technology, for example, long term evolution (LTE) or new radio (NR).

The network device may include an access network device. For example, the network device includes but is not limited to: a next generation base station or a next generation NodeB (gNB), an evolved NodeB (eNB), a radio network controller (RNC), a NodeB (NB), a base station controller (BSC), a base transceiver station (BTS), a home base station (for example, a home evolved nodeB or a home nodeB, HNB), a baseband unit (BBU), a transmitting and receiving point (TRP), a transmitting point (TP), a mobile switching center, a small cell, a micro cell, or the like in a 5G network. The network device may alternatively be a radio controller, a central unit (CU), and/or a distributed unit (DU) in a cloud radio access network (CRAN) scenario. Alternatively, the network device may be a relay station, an access point, a vehicle-mounted device, a terminal, a wearable device, a network device in future mobile communication, a network device in a future evolved PLMN, or the like.

The network device may alternatively include a core network device. For example, the core network device may include a session management function (session management function, SMF) and the like.

(3) A frequency hopping pattern is also referred to as a frequency hopping sequence, and indicates frequency band selection at a frequency hopping moment. If a plurality of devices (which are generally a plurality of terminal devices) select a same frequency band at a same frequency hopping moment, it is considered that a collision occurs between the plurality of devices.

(4) Euclidean space may be two-dimensional space or higher-dimensional space.

In embodiments of the disclosure, points in the Euclidean space may be in a one-to-one correspondence with terminal devices in a network. In the Euclidean space, any two line segments have only two location relationships: intersection or parallel, and two intersected line segments have only one intersection point. Therefore, a frequency hopping pattern is designed by using the property in the Euclidean space, so that a maximum quantity of times of collisions between any two terminal devices in a frequency hopping pattern is 1.

The term "and/or" in the disclosure describes an association relationship for describing associated objects and represents that three relationships may exist. For example, A and/or B may represent the following three cases: Only A exists, both A and B exist, and only B exists. The character "/" generally indicates an "or" relationship between the associated objects.

In the disclosure, "at least one" means one or more, and "a plurality of" means two or more.

In addition, it should be understood that in descriptions of the disclosure, terms such as "first" and "second" are merely used for distinguishing and description, but should not be understood as indicating or implying relative importance, or should not be understood as indicating or implying a sequence.

The technical solutions in embodiments may be applied to various communication systems (which are also referred to as mobile communication systems or wireless communication systems). FIG. 1 shows a possible communication system architecture, including one or more network devices (for example, a base station in FIG. 1) and one or more terminal devices (for example, UE 1 to UE 6 in FIG. 1). The base station may send data to the UE 1 to the UE 6, and the UE 1 to the UE 6 may also send uplink data to the base station. Optionally, the UE 4, the UE 5, and the UE 6 may form a communication system. In the communication system, the base station may send downlink data to the UE 1, the UE 2, the UE 5, and the like, and the UE 5 may forward the downlink data to the UE 4 and the UE 6. For example, the UE 5 may serve as a relay node to forward data between the UE and the base station. For example, a relay node may be deployed in a single-hop or multi-hop relay system, and a form of the relay node may be customer-premises equipment (CPE), a small cell, an integrated access and backhaul (IAB) node, a DU, a terminal device, a TRP, or the like.

In a wireless communication system, multi-user sharing resources such as time domain resources, frequency domain resources, and space domain resources should be taken into special consideration. In conventional LTE, NR, and other systems, resources such as time domain resources, frequency domain resources, and space domain resources are allocated to users in an orthogonal multiple access manner, so that each user can exclusively occupy a frequency domain resource, a time domain resource, or a space domain resource. With continuous popularization of applications such as the internet of things, a quantity of users accessing a wireless network increases exponentially. Under a background in which communication resources such as a spectrum are limited, a non-orthogonal multiple access manner needs to be considered, that is, a plurality of users share same resources such as a time domain resource, a frequency domain resource, and a space domain resource in a communication process. In non-orthogonal multiple access, because users share same communication resources, to resolve a problem of inter-user interference (that is, multiple access interference), a frequency hopping mechanism may be introduced in a communication system. A user selects a different frequency band in each transmission to randomize the inter-user interference. This resolves the multiple access interference problem in non-orthogonal multiple access.

Currently, the 3GPP protocol defines a frequency hopping pattern design scheme, supporting intra-slot frequency hopping and inter-slot frequency hopping. Intra-slot frequency hopping applies to a single-slot or multi-slot physical uplink shared channel (PUSCH) transmission scenario. Inter-slot frequency hopping applies to a multi-slot PUSCH transmission scenario.

For intra-slot frequency hopping, a start resource block (RB) location of each frequency hopping may be calculated by using the following formula (1):

$$RB_{start} = \begin{cases} RB_{start} & i = 0 \\ (RB_{start} + RB_{offset}) \bmod N_{BWP}^{size}, & i = 1 \end{cases} \quad (1)$$

i=0 represents a frequency hopping moment 0, i=1 represents a frequency hopping moment 1, $RB_{start}$ represents a start RB location of an uplink bandwidth part (BWP), and may be determined by using configuration information of a resource block of a resource allocation type 1, $RB_{offset}$ represents a frequency domain offset between two frequency hoppings, and $$N_{BWP}^{size}$$

represents a size of a frequency band occupied by a communication bandwidth part.

For inter-slot frequency hopping, a start RB location of a slot $$n_s^{\mu}$$

may be calculated by using the following formula (2).

$$RB_{start}(n_s^{\mu}) = \begin{cases} RB_{start} & n_s^{\mu} \bmod 2 = 0 \\ (RB_{start} + RB_{offset}) \bmod N_{BWP}^{size}, & n_s^{\mu} \bmod 2 = 1 \end{cases} \quad (2)$$

$$n_s^{\mu}$$

is a current slot number in a radio frame.

A design of the foregoing frequency hopping pattern is simple. There are only two frequency hopping moments in time domain, and there are only two frequency bands in frequency domain. When a quantity of users that access a network is large, there are still a large quantity of interfering users on each frequency band, and interference between users is strong.

Based on this, an embodiment of the disclosure provides a frequency hopping pattern indication method that may be applied to the communication system shown in FIG. 1 and may be applied to a single-user or multi-user data transmission scenario in the communication system. In the method, a network device may indicate a frequency hopping pattern to a first terminal device. The first terminal device performs communication based on the frequency hopping pattern. The frequency hopping pattern indicates a frequency band occupied when the first terminal device performs communication at a frequency hopping moment. The first terminal device collides with any other terminal device at a maximum of one frequency hopping moment in one period. A first period corresponds to more than two frequency hopping moments and more than two frequency bands. Therefore, interference between users can be reduced. Collision means that two terminal devices select a same frequency band at a same frequency hopping moment, and the two terminal devices that collide may interfere with each other. Therefore, in embodiments, interference between terminal devices (namely, users) can be reduced by reducing a quantity of times of collisions between the terminal devices.

FIG. 2 is a possible frequency hopping pattern indication method according to an embodiment of disclosure. The method includes the following steps.

S201: A first terminal device obtains first indication information.

In an example, the first terminal device may obtain the first indication information from a network device, that is, the network device may send the first indication information.

Optionally, the first indication information includes identification information of a frequency hopping pattern. In the case, the terminal device stores a correspondence between the identification information of the frequency hopping pattern and the frequency hopping pattern. Alternatively, the first indication information may include the frequency hopping pattern, that is, the first indication information may indicate the frequency hopping pattern. In the case, the terminal device may store the frequency hopping pattern or may not store the frequency hopping pattern.

The identification information of the frequency hopping pattern may include a number of the frequency hopping pattern in a frequency hopping pattern set or may include a signature sequence. A frequency band granularity of the signature sequence may be of a resource block level or a resource element level. The identification information of the frequency hopping pattern is described below.

The example may be applied to the following scenarios:

Scenario 1: In a scheduling-based uplink data transmission scenario, the network device sends the first indication information to the first terminal device, and the first terminal device performs activation and sends data based on scheduling of the network device.

If a plurality of terminal devices (including the first terminal device) are connected to a network, the network device may separately send corresponding indication information to each terminal device to indicate a frequency hopping pattern.

Scenario 2: In a pre-configuration-based uplink data transmission scenario, the network device sends the first indication information to the first terminal device, and the first terminal device performs random activation and sends data when the data arrives.

Scenario 3: In a random selection-based uplink data transmission scenario, the network device broadcasts a plurality of frequency hopping patterns to the first terminal device, and the first terminal device performs random activation when data arrives, and randomly selects one frequency hopping pattern from the plurality of frequency hopping patterns to send the data.

In the scenario, the first indication information may indicate identification information of one or more frequency hopping patterns, and the terminal device selects a frequency hopping pattern corresponding to one piece of identification information. The one or more frequency hopping patterns may belong to one frequency hopping pattern set.

In another example, first indication information may be preconfigured in the first terminal device or specified in a protocol, and the first terminal device may obtain the first indication information from the first terminal device.

The first indication information indicates a frequency hopping pattern. The frequency hopping pattern may be understood as a frequency hopping sequence and indicates a frequency band occupied when the first terminal device performs communication at a frequency hopping moment. The frequency band indicated by the frequency hopping pattern (namely, a frequency band of the frequency hopping pattern in frequency domain) may be a continuous frequency band or a discontinuous frequency band, and one frequency band may include one or more frequencies. The frequency may be of a resource block RB level or a resource element (RE) level. A granularity of the frequency hopping pattern in time domain may be one or more orthogonal frequency-division multiplexing (OFDM) symbols or may be one or more slots.

The first terminal device collides with any other terminal device at a maximum of one moment in one period, and the period corresponds to more than two frequency hopping moments and more than two frequency bands. Specifically, in Euclidean space, each frequency hopping moment corresponds to (one or more) parallel line clusters, each frequency band corresponds to (one or more) line segments, one parallel line cluster includes a plurality of line segments that are parallel to each other, each line segment includes a plurality of points, and (one or more) terminal devices correspond to points in the Euclidean space.

That two terminal devices collide means that the two terminal devices select a same frequency band at a same frequency hopping moment. In the embodiment of the disclosure, a maximum quantity of times of collisions between different terminal devices may be flexibly configured through design of a frequency hopping pattern. Because a maximum quantity of times of collisions between terminal devices in one period is 1, for example, in a manner, a plurality of periods may be spliced and combined to flexibly configure a maximum quantity of times of collisions between the terminal devices. In addition, for a frequency-selective fading channel, a frequency hopping pattern may use frequency domain diversity as much as possible, to further effectively improve reliability of a communication system.

A period may be a length of a cyclic section of a frequency hopping sequence. In a possible manner, the length of a cycle section of a frequency hopping sequence may be determined based on a supported maximum quantity of frequency hopping moments. A supported maximum quantity of frequency hopping moments may be represented by elements in a frequency hopping moment set. For example, a supported maximum quantity of frequency hopping moments is 5. One frequency hopping moment set may include five elements in total: T1, T2, T3, T4, and T5. In the case, one period may include five frequency hopping moments that are T1, T2, T3, T4, and T5, and each frequency hopping moment corresponds to a frequency band (generally corresponds to one frequency band). In another possible manner, the length of a cycle section of a frequency hopping sequence may be determined based on a quantity of supported frequency bands. The quantity of supported frequency bands may be represented by using a quantity of elements in a frequency band set. For example, four frequency bands are supported. One frequency band set may include four elements: F1, F2, F3, and F4. In the case, one period may include four frequency bands, and each frequency band corresponds to a frequency hopping moment (and may generally correspond to a plurality of frequency hopping moments). It may be understood that a maximum quantity of frequency hopping moments and a maximum quantity of frequency bands that are supported are not limited in the disclosure.

S202: The first terminal device performs communication based on the frequency hopping pattern indicated by the first indication information.

Correspondingly, the network device may perform communication based on the frequency hopping pattern indicated by the first indication information.

For example, at a first frequency hopping moment, the network device communicates with the terminal device by using a first frequency band that corresponds to a first frequency hopping moment and that is in the frequency hopping pattern.

The network device and the terminal device store the frequency hopping pattern or a frequency hopping pattern set (including one or more frequency hopping patterns). The frequency hopping pattern or the frequency hopping pattern set may be specified in the 3GPP protocol, or may be generated by the network device, or may be generated by the terminal device. In embodiments, the frequency hopping pattern set is used as an example for description. The network device or the terminal device generates the frequency hopping pattern set, so that storage overheads of the network device and the terminal device can be reduced, and a frequency hopping pattern has a pseudo-random characteristic.

Manner 1: The frequency hopping pattern is generated by the network device.

The network device obtains a first parameter and a second parameter. The network device may generate the frequency hopping pattern set based on the first parameter and the second parameter. The frequency hopping pattern set includes one or more frequency hopping patterns, and the one or more frequency hopping patterns include the frequency hopping pattern indicated by the first indication information.

Optionally, the network device may send the generated frequency hopping pattern set to the terminal device.

In a possible implementation, the first parameter is related to a Euclidean space dimension. The second parameter is related to points in the Euclidean space, and the points in the Euclidean space corresponds to the terminal devices. For example, points in Euclidean space may be in a one-to-one correspondence with terminal devices in a network.

When obtaining the first parameter and the second parameter, the network device may determine the first parameter and the second parameter based on a quantity of frequency bands, a quantity of terminal devices in a network, and a quantity of frequency hopping moments. In m-dimensional Euclidean space, points in the Euclidean space form an m-dimensional vector $a=[a_1\ a_2\ \ldots\ a_m]$, where an element in the vector $a_i \in GF(2^S)$, $1 \in [1, m]$, and GF is a Galois field (Galois field). Therefore, the m-dimensional Euclidean space may be denoted as EG $(m, 2^s)$, that is, the m-dimensional Euclidean space includes $2^{ms}$ points, that is, supports $2^{ms}$ users. It is assumed that $a_0$ and a are two linear independent points (that is, $\beta_0 a_0 + \beta a \neq 0$, except for $\beta_0 = \beta = 0$), and there is a set $\{a_0 + \beta a\}$ of the following $2^s$ points. $\beta \in GF(2^s)$. The set $\{a_0 + \beta a\}$ forms a line segment that passes through a point $a_0$ in EG $(m, 2^s)$. There are $2^{ms}$ points in the Euclidean space, and one line segment includes $2^s$ points. Therefore, one parallel line cluster may include $2^{(m-1)s}$ parallel line segments that are parallel to each other, that is, a quantity of frequency bands that can be selected at a frequency hopping moment $q=2^{(m-1)s}$. In addition, EG (m, $2^s$) includes a total of $(2^{ms}-1)/(2^s-1)$ parallel line clusters. Therefore, a supported maximum quantity of frequency hopping moments is equal to $(2^{ms}-1)/(2^s-1)$. Therefore, the network device may select an appropriate first parameter m and an appropriate second parameter s based on the quantity of frequency bands $q=2^{(m-1)s}$, the quantity of terminal devices in a network $K=2^{ms}$, and the quantity of frequency hopping moments $T_{max}=(2^{ms}-1)/(2^s-1)$.

When the network device generates the frequency hopping pattern set based on the first parameter and the second parameter, the following steps are included:

The network device determines a primitive polynomial corresponding to the first parameter and the second parameter, where the primitive polynomial is used to generate a first representation form and a second representation form. Specifically, the primitive polynomial is used to generate a first representation form and a second representation form of each point. For example, the following Table 1.1 shows power representation forms, polynomial representation forms, and binary representation forms corresponding to 16 points. A first representation form and a second representation form are two of the power representation form, the polynomial representation form, and the binary representation form. For example, the first representation form is the power representation form, and the second representation form is the binary representation form. It may be understood that Table 1.1 in embodiments is only an example and does not constitute a limitation on a representation form. There may be more or fewer representation forms in Table 1.1. For example, the representation forms in Table 1.1 may be split or combined.

TABLE 1.1

| Power representation | Polynomial representation | Four-dimensional vector binary representation |
|---|---|---|
| 0 | 0 | (0000) |
| 1 | 1 | (1000) |
| a | a | (0100) |
| $a^2$ | $a^2$ | (0010) |
| $a^3$ | $a^3$ | (0001) |
| $a^4$ | $1 + a$ | (1100) |
| $a^5$ | $a + a^2$ | (0110) |
| $a^6$ | $a^2 + a^3$ | (0011) |
| $a^7$ | $1 + a + a^3$ | (1101) |
| $a^8$ | $1 + a^2$ | (1010) |
| $a^9$ | $a + a^3$ | (0101) |
| $a^{10}$ | $1 + a + a^2$ | (1110) |
| $a^{11}$ | $a + a^2 + a^3$ | (0111) |
| $a^{12}$ | $1 + a + a^2 + a^3$ | (1111) |
| $a^{13}$ | $1 + a^2 + a^3$ | (1011) |
| $a^{14}$ | $1 + a^3$ | (1001) |

The network device determines, based on the first representation form, a first line segment that passes through an origin and that is in a first parallel line cluster corresponding to a second frequency hopping moment and in each frequency hopping pattern, where points on the first line segment represent terminal devices on a frequency band corresponding to the first line segment. For example, coordinates of the origin are 0. For a parallel line cluster t∈ [1, T] at a second frequency hopping moment t, the network device determines an initial point $p_t=\alpha^t$ that is not the origin, and calculates, by using the following formula (3), a first line segment $l_0$ that passes through the origin and that is in the parallel line cluster t and $2^s$ points included in the first line segment $l_0$.

$$k \cdot p_t \qquad (3)$$

$$k \in GF(2^s) = \{0, 1, \beta, \ldots, \beta^{2^s-2}\}, \text{ and } \beta = \alpha^{\frac{2^{ms}-1}{2^s-1}}.$$

If coordinates of the origin are not 0, the network device may determine a first line segment in each frequency hopping pattern based on the first representation form and the second representation form. For example, a first value may be added based on the formula (2), where the first value may be $p_0$.

The network device determines, based on the first representation form, the second representation form, and the first line segment in each frequency hopping pattern, all second line segments that are in each first parallel line cluster and parallel to the first line segment. For example, for the parallel line cluster t∈ [1, T] at the second frequency hopping moment t, the network device may calculate, by using the following formula (4), remaining $2^{(m-1)s}-1$ second line segments parallel to the first line segment $l_0$ and points included in each second line segment.

$p_0+k \cdot p_t(4)$. $p_0 \neq 0$ and is linearly independent of $p_t$.

It may be understood that, in the manner, a frequency hopping pattern is mainly generated based on GF ($2^s$), and a generation process of a Galois field (namely, GF ($p^s$), where p is a prime number) of remaining prime powers is similar.

The network device determines each frequency hopping pattern in the frequency hopping pattern set based on a mapping relationship between the first line segment, the second line segment, and points in each first parallel line cluster.

In still another possible implementation, the network device determines a first parameter $s=\lceil \log_2 (K/R) \rceil$ and a second parameter $m=\lceil (\log_2 K)/s \rceil$ based on a quantity $K=2^{ms}$ of users accessing a network and a quantity $R=2^{(m-1)s}$ of available frequency bands of a system, and generates the frequency hopping pattern set based on the first parameter and the second parameter.

When the network device generates the frequency hopping pattern set based on the first parameter and the second parameter, the following steps are included.

The network device determines a primitive polynomial $f(X)=f_{ms}X^{ms}+\ldots+f_1X+f_0$ corresponding to the first parameter and the second parameter, where $f_i \in [0,1]$, $l=0, 1, \ldots,$ ms. As shown in Table 1.2, d represents a maximum power of X in the primitive polynomial $f(X)$. For example, when m=2 and s=2, a corresponding primitive polynomial is $f(X)=X^4+X+1$.

TABLE 1.2

| Primitive polynomial | |
|---|---|
| d = 3 | $f(X) = X^3 + X + 1$ |
| d = 4 | $f(X) = X^4 + X + 1$ |
| d = 5 | $f(X) = X^5 + X^2 + 1$ |
| d = 6 | $f(X) = X^6 + X + 1$ |
| d = 7 | $f(X) = X^7 + X^3 + 1$ |
| d = 8 | $f(X) = X^8 + X^4 + X^3 + X^2 + 1$ |

The primitive polynomial is used to generate a mapping relationship between a first representation form and a second representation form of each point in GF ($2^{ms}$), where the first representation form is a power representation form, and the second representation form is a binary vector. For example, Table 1.3 shows power representation forms and binary vector representation forms corresponding to 16 user points, where a user ID 1 to a user ID 16 represent the 16 user points respectively.

TABLE 1.3

| User ID | Power representation | Four-dimensional vector binary representation |
|---------|---------------------|---------------------------------------------|
| 1 | 0 | (0000) |
| 2 | 1 | (1000) |
| 3 | a | (0100) |
| 4 | $a^2$ | (0010) |
| 5 | $a^3$ | (0001) |
| 6 | $a^4$ | (1100) |
| 7 | $a^5$ | (0110) |
| 8 | $a^6$ | (0011) |
| 9 | $a^7$ | (1101) |
| 10 | $a^8$ | (1010) |
| 11 | $a^9$ | (0101) |
| 12 | $a^{10}$ | (1110) |
| 13 | $a^{11}$ | (0111) |
| 14 | $a^{12}$ | (1111) |
| 15 | $a^{13}$ | (1011) |
| 16 | $a^{14}$ | (1001) |

Generating binary representation forms of $K=2^{ms}$ points in GF $(2^{ms})$ based on the primitive polynomial may be in the following procedure:

A primitive polynomial $f(X)=f_{ms}X^{ms}+ \ldots +f_1X+f_0$ is determined based on the first parameter and the second parameter, where $f_l \in \{0,1\}$, $l=0, 1, \ldots, ms$, and $b_{primpoly}=[f_0f_1 \ldots f_{ms-1}]$ is set to be a binary vector formed by coefficients of terms in the primitive polynomial other than a highest-order term. For a point "0" and a point "1" (in a power representation form) in GF $(2^{ms})$, binary vectors corresponding to the point "0" and the point "1" are respectively set to $b_1=[0\ 0 \ldots 0]_{ms\times1}$ and $b_2=[10 \ldots 0]_{ms\times1}$. For example, when $m=2$ and $s=2$, $b_1=[0\ 0\ 0\ 0]_{4\times1}$ and $b_2=[1\ 0\ 0\ 0]_{4\times1}$. Binary representation of remaining points may be obtained through calculation by using the following operations, $b_i=\text{circshift}(b_{i-1}, 1)$, $i=3, 4, \ldots, 2^{ms}$, where $\text{circshift}(v, 1)$ indicates that a vector $v$ is cyclically shifted to the right by one bit. After the cyclic shift is completed, when $b_i(1)=1$, $b_i(1)=0$ is set, and $b_i=\text{mod}(b_i+b_{primpoly}, 2)$, to obtain a final binary representation form.

The maximum quantity of frequency hopping moments $T_{max}=(2^{ms}-1)/(2^s-1)$ is set. The following two steps may be performed to calculate user sets that are respectively mapped to R frequency bands within $[1, T_{max}]$ frequency hopping moments:

Step 1: Determine $2^s$ user sets $U_{r=1,t}$ that are mapped to a frequency band $r=1$ at a moment $t \in [1, T_{max}]$. First, $U_{r=1,t}(1)=1$ is set, that is, a user 1 is mapped to the frequency band $r=1$ at the moment t. $E_{r=1,t}=\text{mod}(k+u_t, K-1)$ is calculated, where $u_t=u(t)$ is the $t^{th}$ element in a vector $u=[2, 3, \ldots, T_{max}+1]$, and a vector $k=T_{max}\cdot[0, 1, \ldots, 2^s-2]$. Therefore, IDs of remaining $2^s-1$ users that are mapped to the frequency band $r=1$ are $U_{r=1,t}(i)=E_{r=1,t}(i-1)+2$, where $i=2, 3, \ldots, 2^s$.

Step 2: Determine user sets $U_{r,t}$, where $r\neq1$, that are mapped to remaining frequency bands at the moment $t \in [1, T_{max}]$. For any frequency band $r>1$, $$u_0^{r,t} = \min U/\bigcup_{1:r-1} U_{r,t}$$

is set, where $U=[1, 2, \ldots, K]$ is a set of all user IDs, that is, $$u_0^{r,t}$$

is a smallest user ID in the set of all users other than a union set $U_{1:r-1}U_{r,t}$. Table 1.3 is searched for a binary vector representation form $$b_0^{r,t}$$

corresponding to the user $$u_0^{r,t},$$

and $$B_{r,t} = \text{mod}\left(b_0^{r,t} + B_{r=1,t}, 2\right)$$

is calculated, where $B_{r=1,t}$ corresponds to binary vector representation forms of $2^s$ users that are mapped to the frequency band $r=1$. Based on the calculated binary vector representations $B_{r,t}$, Table 1.3 is searched for the corresponding user IDs, namely, $2^s$ user sets $U_{r,t}$ that are mapped to the frequency band r at the moment t.

Manner 2: The frequency hopping pattern is generated by the terminal device.

In Manner 2, the network device may send second indication information to the terminal device, where the second indication information indicates a parameter for generating a frequency hopping pattern set. For example, the second indication information includes one or more of the following: a first parameter m, a second parameter s, a primitive polynomial $P(X)$, a frequency hopping moment set $\{1, 2, \ldots, T\} \subseteq \{1, 2, \ldots, T_{max}\}$, and a correspondence between terminal devices in a network and points in Euclidean space (namely, a number of a corresponding point that is in the Euclidean space and that is of a terminal device). A sequence of frequency hopping moments may correspond to any sequence of parallel line clusters. This is not limited herein. For example, the sequence may be indicated by the network device to the terminal device.

For a process in which the terminal device generates the frequency hopping pattern in the manner, refer to the process in which the network device generates the frequency hopping pattern in the foregoing manner 1. Similarities are not described again.

Optionally, the terminal device may send the generated frequency hopping pattern set to the network device.

Manner 3: The frequency hopping pattern is specified in the 3GPP protocol.

Figure 3:
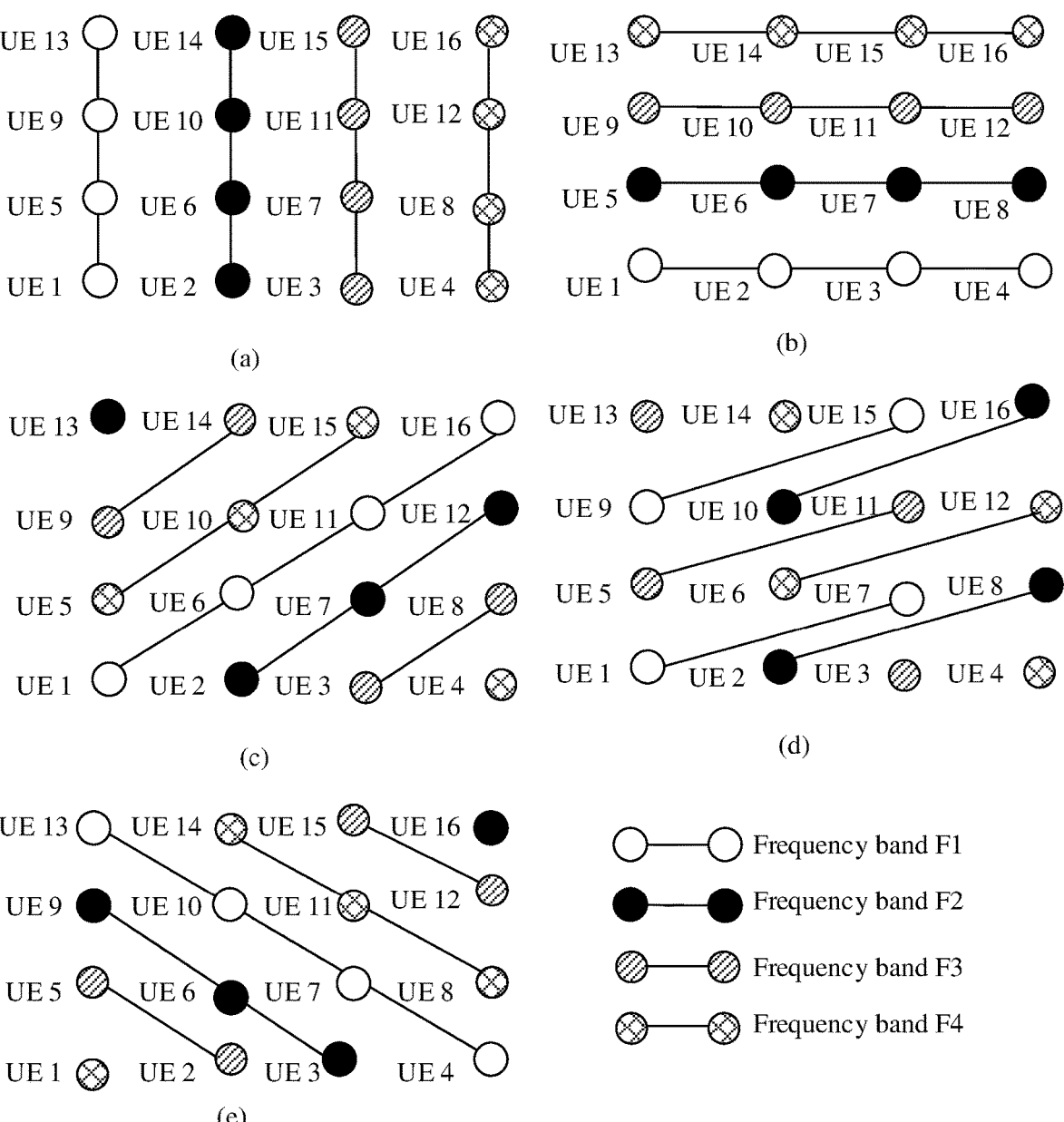
FIG. 3 is a schematic diagram of a design of a frequency hopping pattern according to an embodiment of the disclosure.

For example, a quantity of terminal devices is 16, and there are 5 frequency hopping moments. Generated parallel line clusters are shown in FIG. 3. In Euclidean space, 16 points correspond to 16 UEs respectively, and four parallel line segments in each parallel line cluster correspond to a frequency band F1 to a frequency band F4 respectively. UEs on F1 are represented by white-filled circles, UEs on F2 are represented by black-filled circles, UEs on F3 are represented by oblique line-filled circles, and UEs on F4 are represented by grid-filled circles. Each parallel line cluster is used as a frequency hopping moment, and the UE may select a corresponding frequency band for communication at a frequency hopping moment based on a number of a corresponding point that is of the UE and that is in the Euclidean space.

As shown in (a) in FIG. 3, at a first frequency hopping moment T1 corresponding to a parallel line cluster 1, UEs that select the frequency band F1 include UE 1, UE 5, UE 9, and UE 13, UEs that select the frequency band F2 include UE 2, UE 6, UE 10, and UE 14, UEs that select the frequency band F3 include UE 3, UE 7, UE 11, and UE 15, and UEs that select the frequency band F4 include UE 4, UE 8, UE 12, and UE 16. As shown in (b) in FIG. 3, at a first frequency hopping moment T2 corresponding to a parallel line cluster 2, UEs that select the frequency band F1 include the UE 1, the UE 2, the UE 3, and the UE 4, UEs that select the frequency band F2 include the UE 5, the UE 6, the UE 7, and the UE 8, UEs that select the frequency band F3 include the UE 9, the UE 10, the UE 11, and the UE 12, and UEs that select the frequency band F4 include the UE 13, the UE 14, the UE 15, and the UE 16. As shown in (c) in FIG. 3, at a first frequency hopping moment T3 corresponding to a parallel line cluster 3, UEs that select the frequency band F1 include the UE 1, the UE 6, the UE 11, and the UE 16, UEs that select the frequency band F2 include the UE 2, the UE 7, the UE 12, and the UE 13, UEs that select the frequency band F3 include the UE 3, the UE 8, the UE 9, and the UE 14, and UEs that select the frequency band F4 include the UE 4, the UE 5, the UE 10, and the UE 15. As shown in (d) in FIG. 3, at a first frequency hopping moment T4 corresponding to a parallel line cluster 4, UEs that select the frequency band F1 include the UE 1, the UE 7, the UE 9, and the UE 15, UEs that select the frequency band F2 include the UE 2, the UE 8, the UE 10, and the UE 16, UEs that select the frequency band F3 include the UE 3, the UE 5, the UE 11, and the UE 13, and UEs that select the frequency band F4 include the UE 4, the UE 6, the UE 12, and the UE 14. As shown in (e) in FIG. 3, at a first frequency hopping moment T5 corresponding to a parallel line cluster 5, UEs that select the frequency band F1 include the UE 4, the UE 7, the UE 10, and the UE 13, UEs that select the frequency band F2 include the UE 3, the UE 6, the UE 9, and the UE 16, UEs that select the frequency band F3 include the UE 2, the UE 5, the UE 12, and the UE 15, and UEs that select the frequency band F4 include the UE 1, the UE 8, the UE 11, and the UE 14.

It may be understood that in each parallel line cluster, a correspondence between a line segment and a frequency band is not unique. For example, in addition to the mapping manner provided in FIG. 3, in a possible manner, a line segment including white-filled circles corresponds to F2, a line segment including oblique line-filled circles corresponds to F1, a line segment including grid-filled circles corresponds to F3, and a line segment including a black-filled circle corresponds to F4. In addition, different parallel line clusters may use different mapping manners. This is not limited in embodiments.

Frequency bands selected by each UE at different frequency hopping moments may be obtained based on FIG. 3. For example, frequency bands of the UE 2 at the frequency hopping moment T1 to the frequency hopping moment T5 are F2, F1, F2, F2, and F3.

Based on FIG. 3, Table 2 shows frequency hopping patterns corresponding to 16 UEs in the Euclidean space, where the first row in the table represents frequency hopping moments, and each of the remaining rows represents a frequency hopping pattern. The first column in Table 2 represents numbers of the UEs, and the second column to the sixth column correspond to frequency bands at different frequency hopping moments. It may be understood that Table 2 in the embodiment of the disclosure is only an example and does not constitute a limitation on a user (or a terminal device), a frequency hopping moment, and a frequency band. There may be more or fewer users (or terminal devices), frequency hopping moments, and frequency bands in Table 2.

TABLE 2

| User/Frequency hopping moment | T1 | T2 | T3 | T4 | T5 |
|---|---|---|---|---|---|
| UE 1 | F1 | F1 | F1 | F1 | F4 |
| UE 2 | F2 | F1 | F2 | F2 | F3 |
| UE 3 | F3 | F1 | F3 | F3 | F2 |
| UE 4 | F4 | F1 | F4 | F4 | F1 |
| UE 5 | F1 | F2 | F4 | F3 | F3 |
| UE 6 | F2 | F2 | F1 | F4 | F2 |
| UE 7 | F3 | F2 | F2 | F1 | F1 |
| UE 8 | F4 | F2 | F3 | F2 | F4 |
| UE 9 | F1 | F3 | F3 | F1 | F2 |
| UE 10 | F2 | F3 | F4 | F2 | F1 |
| UE 11 | F3 | F3 | F1 | F3 | F4 |
| UE 12 | F4 | F3 | F2 | F4 | F3 |
| UE 13 | F1 | F4 | F2 | F3 | F1 |
| UE 14 | F2 | F4 | F3 | F4 | F4 |
| UE 15 | F3 | F4 | F4 | F1 | F3 |
| UE 16 | F4 | F4 | F1 | F2 | F2 |

Optionally, in some cases, the first column in Table 2 may be replaced with a number of a frequency hopping pattern, as shown in Table 3. Table 3 shows 16 frequency hopping patterns in the Euclidean space, where the first row in the table represents frequency hopping moments, and each of the remaining rows represents a frequency hopping pattern. The first column in Table 3 represents numbers of the frequency hopping patterns, and the second column to the sixth column correspond to frequency bands at different frequency hopping moments. It may be understood that Table 3 in the embodiment of the disclosure is only an example and does not constitute a limitation on a number of a frequency hopping pattern, a frequency hopping moment, and a frequency band. There may be more or fewer numbers of frequency hopping patterns, frequency hopping moments, and frequency bands in Table 3.

TABLE 3

| Number/Frequency hopping moment | T1 | T2 | T3 | T4 | T5 |
|---|---|---|---|---|---|
| 1 | F1 | F1 | F1 | F1 | F4 |
| 2 | F2 | F1 | F2 | F2 | F3 |
| 3 | F3 | F1 | F3 | F3 | F2 |
| 4 | F4 | F1 | F4 | F4 | F1 |
| 5 | F1 | F2 | F4 | F3 | F3 |
| 6 | F2 | F2 | F1 | F4 | F2 |
| 7 | F3 | F2 | F2 | F1 | F1 |
| 8 | F4 | F2 | F3 | F2 | F4 |
| 9 | F1 | F3 | F3 | F1 | F2 |
| 10 | F2 | F3 | F4 | F2 | F1 |
| 11 | F3 | F3 | F1 | F3 | F4 |
| 12 | F4 | F3 | F2 | F4 | F3 |
| 13 | F1 | F4 | F2 | F3 | F1 |
| 14 | F2 | F4 | F3 | F4 | F4 |
| 15 | F3 | F4 | F4 | F1 | F3 |
| 16 | F4 | F4 | F1 | F2 | F2 |

In the Euclidean space, any two line segments have only two location relationships: intersection or parallel, and the two intersection line segments have only one intersection point. Therefore, a quantity of times that any two frequency hopping patterns collide in one period (T1 to T5 in FIG. 2 are one period) may not exceed 1.

Alternatively, in S201, the identification information of the frequency hopping pattern may be a signature sequence.

For example, when a frequency band granularity of frequency domain is of a resource block level, the network device may indicate the following signature sequence $S_i$ to the terminal device based on the frequency hopping pattern:

$$S_i = \begin{bmatrix} 0 & 1 & 0 & 0 & 1 \\ 1 & 0 & 0 & 0 & 0 \\ 0 & 0 & 0 & 1 & 0 \\ 0 & 0 & 1 & 0 & 0 \end{bmatrix},$$

where i represents an $i^{th}$ terminal device/frequency hopping pattern, a row of the signature sequence represents a frequency band, a column represents a frequency hopping moment, an element of 1 represents that one frequency band is selected at a frequency hopping moment, and an element of 0 represents that no frequency band is selected at a frequency hopping moment. $S_i$ indicates that $i^{th}$ user equipment selects an RB 2 (the frequency F2), an RB 1 (the frequency F1), an RB 4 (the frequency F4), an RB 3 (the frequency F3), and an RB 1 (the frequency F1) at five frequency hopping moments respectively.

For another example, when a frequency band granularity of frequency domain is of a resource element level, the network device may indicate the following signature sequence $S_i$ to the terminal device based on the frequency hopping pattern:

$$S_i = \begin{bmatrix} 0 & 1 & 0 & 0 & 1 \\ 0 & 1 & 0 & 0 & 1 \\ 0 & 1 & 0 & 0 & 1 \\ 1 & 0 & 0 & 0 & 0 \\ 1 & 0 & 0 & 0 & 0 \\ 1 & 0 & 0 & 0 & 0 \\ 0 & 0 & 0 & 1 & 0 \\ 0 & 0 & 0 & 1 & 0 \\ 0 & 0 & 0 & 1 & 0 \\ 0 & 0 & 1 & 0 & 0 \\ 0 & 0 & 1 & 0 & 0 \\ 0 & 0 & 1 & 0 & 0 \end{bmatrix},$$

where i represents an $i^{th}$ terminal device/frequency hopping pattern, a row of the signature sequence represents a frequency band, a column represents a frequency hopping moment, an element of 1 represents that one frequency band is selected at a frequency hopping moment, and an element of 0 represents that no frequency band is selected at a frequency hopping moment. $S_i$ indicates that the $i^{th}$ user equipment selects an RE 4 to an RE 6 (the frequency F2), an RE 1 to an RE 3 (the frequency F1), an RE 10 to an RE 12 (the frequency F4), an RE 7 to an RE 9 (the frequency F3), and an RE 1 to an RE 3 (the frequency F1) on frequency bands at five frequency hopping moments.

The signature sequence may be a sparse sequence. A non-zero element 1 indicates selection of one or more (that is, the element 1 may correspond to one or more RBs) and consecutive or non-consecutive resources (that is, the resources may be consecutive or inconsecutive in frequency domain, and in the case, 1 in each column in a second signature matrix may be inconsecutive) by the terminal device in frequency domain.

The following describes, with reference to a simulation result, a block error rate (BLER) of the frequency hopping pattern indication method provided in the embodiment of the disclosure.

Figure 4:
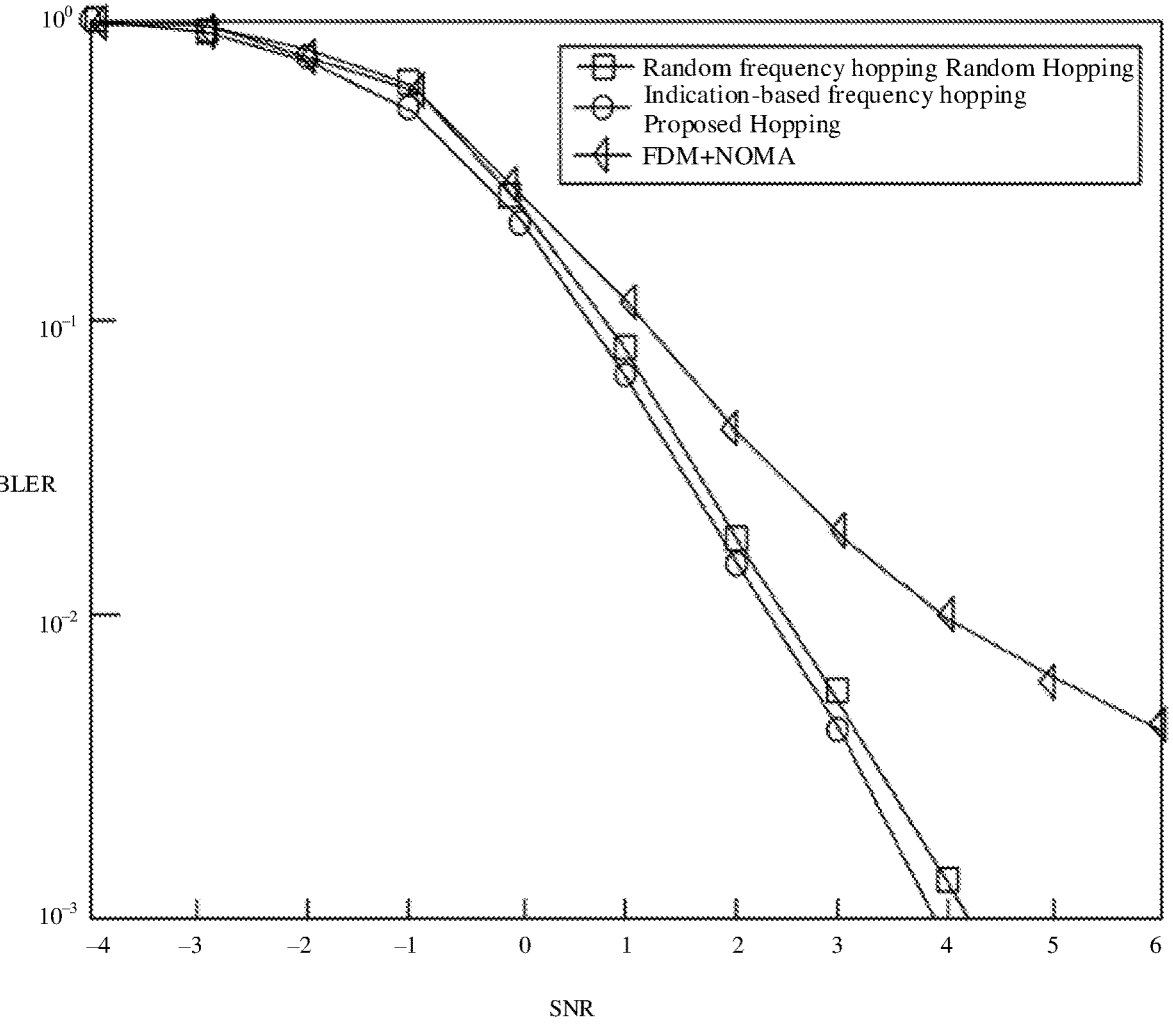
FIG. 4 is a schematic diagram of a simulation result according to an embodiment of the disclosure.

As shown in FIG. 4, in a scenario of uplink data transmission based on pre-configuration, based on ideal channel estimation and a same signal-to-noise ratio (SNR), in the frequency hopping indication method provided in the embodiment of the disclosure, a BLER of the terminal device in random frequency hopping or indication-based frequency hopping (also referred as proposed hopping) is lower than a BLER in a conventional frequency-division multiplexing (FDM) and non-orthogonal multiple access (NOMA) combination manner.

Figures 5, 6:
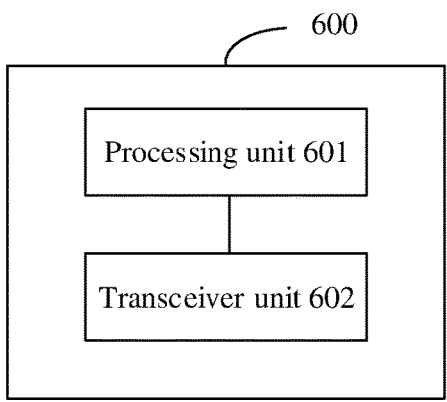
FIG. 5 is a schematic diagram of a simulation result according to an embodiment of the disclosure.
FIG. 6 is a schematic diagram of a structure of a communication apparatus according to an embodiment of the disclosure.

As shown in FIG. 5, in a scenario of uplink data transmission based on pre-configuration, based on actual channel estimation and a same SNR, in the frequency hopping indication method provided in the embodiment of the disclosure, a BLER of the terminal device in random hopping or proposed hopping is lower than a BLER in a conventional FDM+NOMA combination manner.

It can be learned from the foregoing comparison that the frequency hopping pattern indication method provided in the embodiment of the disclosure has a large performance gain under both ideal channel estimation and actual channel estimation, and communication reliability is higher.

In the embodiment, the network device may indicate a frequency hopping pattern to the first terminal device. The first terminal device performs communication based on the frequency hopping pattern. The frequency hopping pattern indicates a frequency band occupied when the first terminal device performs communication at a frequency hopping moment. The first terminal device collides with any other terminal device at a maximum of one frequency hopping moment in one period, so that a quantity of times of collisions between users can be as small as possible. This reduces interference between users.

It may be understood that in the foregoing embodiments, a method and/or step implemented by the network device may alternatively be implemented by a component (for example, a chip or a circuit) that can be used in the network device, and a method and/or step implemented by the terminal device may alternatively be implemented by a component that can be used in the terminal device.

The foregoing embodiment provided in the disclosure separately describes the method provided in the embodiment of the disclosure from a perspective of interaction between the terminal device and the network device. To implement the functions in the method provided in the foregoing embodiments of the disclosure, the transmitting end and the receiving end each may include a hardware structure and/or a software module, to implement the functions in a form of the hardware structure, the software module, or a combination of the hardware structure and the software module. Whether a function in the foregoing functions is performed by using the hardware structure, the software module, or the combination of the hardware structure and the software module depends on the particular application and design constraints of the technical solution.

With reference to the accompanying drawings, the following describes communication apparatuses configured to implement the foregoing method in embodiments of the disclosure. Therefore, all the foregoing content may be used in the following embodiments. Repeated content is not described again.

FIG. 6 is a possible representation form of a communication apparatus according to an embodiment of the disclosure. The communication apparatus 600 may be configured to implement functions or steps implemented by the network device or the terminal device in the foregoing method embodiment. The communication apparatus includes a processing unit 601 and a transceiver unit 602. Optionally, a storage unit may be further included. The storage unit may be configured to store instructions (code or a program) and/or data. The processing unit 601 and the transceiver unit 602 may be coupled to the storage unit. For example, the processing unit 601 may read the instructions (the code or the program) and/or the data in the storage unit, to implement a corresponding method. The foregoing units may be independently disposed or may be partially or completely integrated.

In some possible implementations, the communication apparatus 600 can correspondingly implement behavior and functions of the terminal device in the method embodiment. For example, the transceiver unit 602 is configured to obtain first indication information, where the first indication information indicates a frequency hopping pattern.

The processing unit 601 is configured to determine first indication information.

The transceiver unit 602 is further configured to perform communication based on the frequency hopping pattern.

The frequency hopping pattern indicates a frequency band occupied when a first terminal device performs communication at a frequency hopping moment, the first terminal device collides with any other terminal device at a maximum of one frequency hopping moment in one period, and the period corresponds to more than two frequency hopping moments and more than two frequency bands.

In some possible implementations, in Euclidean space, each frequency hopping moment corresponds to a parallel line cluster, the parallel line cluster includes a plurality of line segments that are parallel to each other, each frequency band corresponds to the line segment, each line segment includes a plurality of points, and terminal devices correspond to the points.

In some possible implementations, the first indication information includes identification information of a frequency hopping pattern, or the first indication information includes a frequency hopping pattern.

In some possible implementations, the identification information of the frequency hopping pattern may include a signature sequence, and a frequency band granularity of the signature sequence may be of a resource block level or a resource element level.

In some possible implementations, the transceiver unit 602 is specifically configured to perform communication at a first frequency hopping moment by using a first frequency band that corresponds to the first frequency hopping moment and that is in the frequency hopping pattern.

In some possible implementations, the communication apparatus 600 can correspondingly implement behavior and functions of the network device in the method embodiment. For example, the processing unit 601 is configured to determine first indication information, where the first indication information indicates a frequency hopping pattern.

The transceiver unit 602 is configured to send the first indication information, and perform communication based on the frequency hopping pattern.

The frequency hopping pattern indicates a frequency band occupied when a first terminal device performs communication at a frequency hopping moment, the first terminal device collides with any other terminal device at a maximum of one frequency hopping moment in one period, and the period corresponds to more than two frequency hopping moments and more than two frequency bands.

In some possible implementations, in Euclidean space, each frequency hopping moment corresponds to a parallel line cluster, the parallel line cluster includes a plurality of line segments that are parallel to each other, each frequency band corresponds to the line segment, each line segment includes a plurality of points, and terminal devices correspond to the points.

In some possible implementations, the processing unit 601 is further configured to: obtain a first parameter and a second parameter; and generate a frequency hopping pattern set based on the first parameter and the second parameter, where the frequency hopping pattern set includes the frequency hopping pattern, the first parameter is related to a Euclidean space dimension, the second parameter is related to a quantity of points in the Euclidean space, and the points in the Euclidean space correspond to the terminal devices.

In some possible implementations, the processing unit is specifically configured to: determine a primitive polynomial corresponding to the first parameter and the second parameter, where the primitive polynomial is used to generate a first representation form and a second representation form; determine, based on the first representation form, a first line segment that passes through an origin and that is in a first parallel line cluster corresponding to a second frequency hopping moment and in each frequency hopping pattern, where points on the first line segment represent terminal devices on a frequency band corresponding to the first line segment; determines, based on the first representation form, the second representation form, and the first line segment in each frequency hopping pattern, all second line segments that are in each first parallel line cluster and parallel to the first line segment, and determine each frequency hopping pattern based on a mapping relationship between the first line segment, the second line segment, and points in each first parallel line cluster.

In some possible implementations, the first indication information includes identification information of a frequency hopping pattern, or the first indication information includes a frequency hopping pattern.

In some possible implementations, the identification information of the frequency hopping pattern may include a signature sequence, and a frequency band granularity of the signature sequence may be of a resource block level or a resource element level.

In some possible implementations, the transceiver unit 602 is specifically configured to perform communication at a first frequency hopping moment by using a first frequency band that corresponds to the first frequency hopping moment and that is in the frequency hopping pattern.

It should be noted that division into the modules in embodiments of the disclosure is an example and is merely logical function division. In actual implementation, there may be another division manner. In addition, function units in embodiments of the disclosure may be integrated into one processing unit, or may exist alone physically, or two or more units may be integrated into one unit. The integrated unit may be implemented in a form of hardware or may be implemented in a form of a software function unit.

When the integrated unit is implemented in the form of a software functional unit and sold or used as an independent product, the integrated unit may be stored in a computer-readable storage medium. Based on such an understanding, the integrated unit may be stored in a storage medium as a computer software product and includes several instructions for instructing a computer device (which may be a personal computer, a server, or a network device) or a processor to perform all or some of the steps of the methods in embodiments of the disclosure.

It should be understood that the processing unit in embodiments of the disclosure may be implemented by a processor/processing circuit or a circuit component related to a processor/processing circuit, and the transceiver unit may be implemented by a transceiver/a transceiver interface, a circuit component related to a transceiver/a transceiver interface, or a communication interface.

Figure 7:
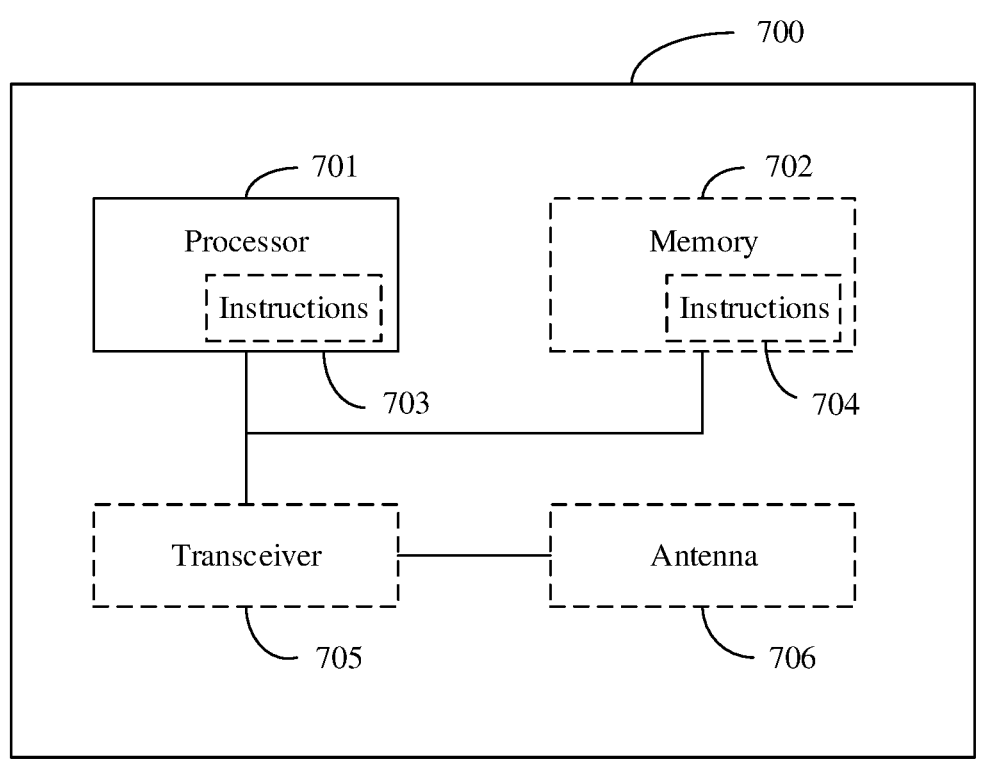
FIG. 7 is a schematic diagram of a structure of a communication apparatus according to an embodiment of the disclosure.

As shown in FIG. 7, an embodiment of the disclosure further provides a schematic diagram of a structure of a communication apparatus 700. The apparatus 700 may be configured to implement the methods described in the foregoing method embodiments. For details, refer to the descriptions in the foregoing method embodiments.

The apparatus 700 includes one or more processors 701. The processor 701 may be a general-purpose processor, a dedicated processor, or the like. For example, the processor may be a baseband processor or a central processing unit. The baseband processor may be configured to process a communication protocol and communication data. The central processing unit may be configured to: control a communication apparatus (for example, a base station, a terminal, or a chip), execute a software program, and process data of the software program. The communication apparatus may include a transceiver unit, configured to input (receive) and output (send) signals. For example, the transceiver unit may be a transceiver or a radio frequency chip.

The apparatus 700 includes one or more processors 701, and the one or more processors 701 may implement the method in the foregoing embodiment.

Optionally, the processor 701 may further implement another function in addition to the method in the foregoing embodiment.

Optionally, in a design, the processor 701 may execute instructions, so that the apparatus 700 performs the method described in the foregoing method embodiment. All or some of the instructions may be stored in the processor, for example, instructions 703, or all or some of the instructions may be stored in a memory 702 coupled to the processor, for example, instructions 704. Alternatively, the instructions 703 and instructions 704 may be used together so that the apparatus 700 performs the method described in the foregoing method embodiment. The instructions 703 are also referred to as a computer program.

In another possible design, the communication apparatus 700 may alternatively include a circuit, and the circuit may implement functions in the foregoing method embodiment.

In still another possible design, the apparatus 700 may include one or more memories 702 storing instructions 704. The instructions may be run on the processor, so that the communication apparatus 700 performs the method described in the foregoing method embodiment. Optionally, the memory may further store data. Optionally, the processor may also store instructions and/or data. For example, the one or more memories 702 may store the correspondence described in the foregoing embodiments, or the related parameter, table, or the like in the foregoing embodiments. The processor and the memory may be separately disposed or may be integrated with each other.

In still another possible design, the apparatus 700 may further include a transceiver 705 and an antenna 706. The processor 701 may be referred to as a processing unit and controls an apparatus (a terminal or a base station). The transceiver 705 may be referred to as a transceiver, a transceiver circuit, a transceiver unit, or the like, and is configured to implement sending and receiving functions of the apparatus by using the antenna 706.

It should be noted that, the processor in embodiments of the disclosure may be an integrated circuit chip and has a signal processing capability. In an implementation process, steps in the foregoing method embodiment can be implemented by using a hardware integrated logical circuit in the processor, or by using instructions in a form of software. The foregoing processor may be a general purpose processor, a digital signal processor (DSP), an application-specific integrated circuit (ASIC), a field programmable gate array (FPGA) or another programmable logic device, a discrete gate or transistor logic device, or a discrete hardware component. The processor may implement or perform the methods, the steps, and the logical block diagrams that are disclosed in embodiments of the disclosure. The general-purpose processor may be a microprocessor, or the processor may be any conventional processor or the like. Steps of the methods disclosed with reference to embodiments of the disclosure may be directly performed and completed by a hardware decoding processor or may be performed and completed by using a combination of hardware in the decoding processor and a software module. A software module may be located in a mature storage medium in the art, such as a random access memory, a flash memory, a read-only memory, a programmable read-only memory, an electrically erasable programmable memory, or a register. The storage medium is located in the memory, and the processor reads information in the memory and completes the steps in the method in combination with hardware in the processor.

It may be understood that the memory in the embodiment of the disclosure may be a volatile memory or a nonvolatile memory or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) that is used as an external cache. Through example but not limitative description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM). It should be noted that the memory of the systems and methods described in the specification includes but is not limited to these and any memory of another proper type.

An embodiment of the disclosure further provides a computer-readable medium. The computer-readable medium stores a computer program. When the computer program is executed by a computer, the method in the foregoing method embodiment is implemented.

An embodiment of the disclosure further provides a computer program product. When the computer program product is executed by a computer, the method in the foregoing method embodiment is implemented.

An embodiment of the disclosure further provides a communication system. The communication system includes a network device and a terminal device. The network device and the terminal device may implement the method described in the foregoing method embodiment.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, the procedure or functions according to embodiments are entirely or partially generated. The computer may be a general-purpose computer, a dedicated computer, a computer network, or any other programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any available medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, an SSD), or the like.

An embodiment of the disclosure further provides a processing apparatus, including a processor and an interface. The processor is configured to perform the method described in the foregoing method embodiments.

It should be understood that the foregoing processing apparatus may be a chip. The processor may be implemented by using hardware or may be implemented by using software. When the processor is implemented by using hardware, the processor may be a logic circuit, an integrated circuit, or the like. When the processor is implemented by using software, the processor may be a general-purpose processor, and is implemented by reading software code stored in the memory. The memory may be integrated in the processor or may be located outside the processor and exist independently.

Figure 8:
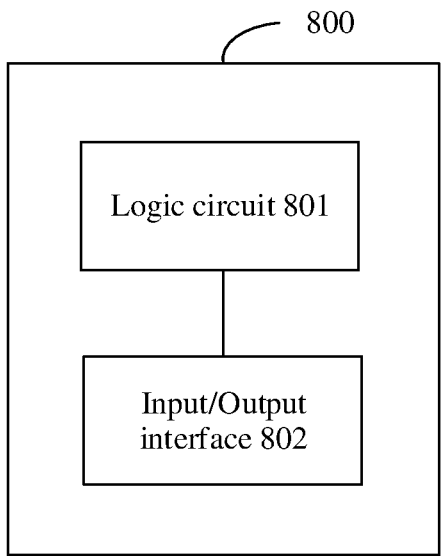
FIG. 8 is a schematic diagram of a structure of a communication apparatus according to an embodiment of the disclosure.

In a possible design, when the communication apparatus is a chip, for example, a chip in a transmit end, or a chip in a receive end, the processing unit 601 or the processor 701 may be one or more logic circuits, and the transceiver unit 602 or the transceiver 705 may be an input/output interface, or may be referred to as a communication interface, or an interface circuit, or an interface, or the like. Alternatively, the transceiver 705 may be a sending unit and a receiving unit. The sending unit may be an output interface, and the receiving unit may be an input interface. Alternatively, the sending unit and the receiving unit are integrated into one unit, for example, an input/output interface. As shown in FIG. 8, a communication apparatus 800 includes a logic circuit 801 and an input/output interface 802. That is, the processing unit 601 or the processor 701 may be implemented by using the logic circuit 801, and the transceiver unit 602 or the transceiver 705 may be implemented by using the input/output interface 802. The logic circuit 801 may be a chip, a processing circuit, an integrated circuit, a system on chip (SoC), or the like. The input/output interface 802 may be a communication interface, an input/output interface, or the like. In the embodiment of the disclosure, the logic circuit and the input/output interface may be further coupled to each other. A specific manner of connection between the logical circuit and the input/output interface is not limited in the embodiment of the disclosure.

In some embodiments of the disclosure, the logic circuit and the input/output interface may be configured to perform a function, an operation, or the like performed by the network device or the terminal device.

For example, the logic circuit 801 is configured to obtain first indication information.

The input/output interface 802 is configured to perform communication based on a frequency hopping pattern indicated by the first indication information.

For functions or operations performed by the network device or the terminal device, refer to the foregoing method embodiment. Details are not described herein again.

A person of ordinary skill in the art may be aware that, in combination with the examples described in embodiments disclosed in the specification, units and algorithm steps can be implemented by electronic hardware, computer software, or a combination thereof. To clearly describe the interchangeability between the hardware and the software, the foregoing has generally described compositions and steps of each example according to functions. Whether the functions are performed by hardware or software depends on the particular application and design constraint conditions of the technical solutions. A person skilled in the art may use different methods to implement the described functions for each particular application, but it should not be considered that the implementation goes beyond the scope of the disclosure.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in the disclosure, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces, indirect couplings or communication connections between the apparatuses or units, or electrical connections, mechanical connections, or connections in other forms.

The units described as separate parts may or may not be physically separate, and parts displayed as units may or may not be physical units, in other words, may be located in one position, or may be distributed on a plurality of network units. Some or all of the units may be selected according to actual requirements to achieve the objectives of the solutions of embodiments in the disclosure.

In addition, function units in embodiments of the disclosure may be integrated into one processing unit, each of the units may exist alone physically, or two or more units may be integrated into one unit. The integrated unit may be implemented in a form of hardware or may be implemented in a form of a software function unit.

With descriptions of the foregoing implementations, a person skilled in the art may clearly understand that the disclosure may be implemented by hardware, firmware, or a combination thereof. When the present invention is implemented by software, the foregoing functions may be stored in a computer-readable medium or transmitted as one or more instructions or code in the computer-readable medium. The computer-readable medium includes a computer storage medium and a communication medium, where the communication medium includes any medium that enables a computer program to be transmitted from one place to another. The storage medium may be any available medium accessible to a computer.

In conclusion, the foregoing descriptions are merely example embodiments of the technical solutions of the disclosure and are not intended to limit the scope of the disclosure. Any modification, equivalent replacement, or improvement made within the principle of the disclosure should fall within the protection scope of the accompanying claims.

What is claimed is:

1. A communication method applied to a first apparatus, the communication method comprising:
   obtaining first indication information, wherein the first indication information indicates a frequency hopping pattern;
   performing, by the first apparatus, communication based on the frequency hopping pattern, wherein:
      the frequency hopping pattern indicates a frequency band occupied when the first apparatus performs communication at a frequency hopping moment;
      the first apparatus collides with a second apparatus at a maximum of one frequency hopping moment in one period, the period corresponding to more than two frequency hopping moments and more than two frequency bands;
   performing, at a first frequency hopping moment, communication by using a first frequency band that corresponds to the first frequency hopping moment and that is included in the frequency hopping pattern;
   where in Euclidean space, each frequency hopping moment corresponds to a parallel line cluster, each parallel line cluster comprising a plurality of line segments arranged parallel to one another, a first frequency band corresponds to a first line segment of the plurality of line segments, the first line segment comprises a first point and a second point, the first apparatus corresponds to the first point in the Euclidean space and the second apparatus corresponds to the second point in the Euclidean space.

2. The method according to claim 1, wherein the first indication information comprises one or more of:
   identification information of the frequency hopping pattern; or
   the frequency hopping pattern.

3. The method according to claim 1, wherein the frequency hopping pattern comprises a signature sequence.

4. The method according to claim 3, wherein a frequency band granularity of the signature sequence is of a resource block level or a resource element level.

5. The method according to claim 2, wherein the first apparatus is at a terminal side and the first indication information is from a third apparatus at a network side.

6. A first apparatus, comprising:
   a memory; and
   at least one processor coupled to the memory, the memory storing a computer program instructions that, when executed by the at least one processor, causes the first apparatus to:
      receive from a network device, second information that comprises a first parameter and a second parameter;
      obtain first indication information indicating a frequency hopping pattern;
      perform communication based on the obtained frequency hopping pattern, wherein:
         the frequency hopping pattern indicates a frequency band occupied when the first apparatus performs communication at a frequency hopping moment;
         the first apparatus collides with a second apparatus at a maximum of one frequency hopping moment in one period, the period corresponding to more than two frequency hopping moments and more than two frequency bands; and
      perform, at a first frequency hopping moment, communication by using a first frequency band that corresponds to the first frequency hopping moment and that is included in the frequency hopping pattern;
   where in Euclidean space, each frequency hopping moment corresponds to a parallel line cluster, each parallel line cluster comprising a plurality of line segments arranged parallel to one another, a first frequency band corresponds to a first line segment of the plurality of line segments, the first line segment comprises a first point and a second point, the first apparatus corresponds to the first point in the Euclidean space and the second apparatus corresponds to the second point in the Euclidean space.

7. The first apparatus according to claim 6, wherein the first indication information comprises one or more of:
   identification information of the frequency hopping pattern; or
   the frequency hopping pattern.

8. The first apparatus according to claim 6, wherein the frequency hopping pattern comprises a signature sequence.

9. The first apparatus according to claim 8, wherein a frequency band granularity of the signature sequence is of a resource block level or a resource element level.

10. The first apparatus according to claim 6, wherein the first apparatus is at a terminal side and the first indication information is from a third apparatus at a network side.

11. A non-transitory computer-readable storage medium comprising a computer program, that, when the computer program is run on a computer, causes the computer to:
   receive from a network device, second indication information that comprises a first parameter and a second parameter;
   generate a frequency hopping pattern based on the first parameter and the second parameter;
   perform communication based on the frequency hopping pattern, where the frequency hopping pattern indicates a frequency band occupied when the computer performs communication at a frequency hopping moment, the computer collides with a second apparatus at a maximum of one frequency hopping moment in one period, and the period corresponds to more than two frequency hopping moments and more than two frequency bands; and
   perform, at a first frequency hopping moment, communication by using a first frequency band that corresponds to the first frequency hopping moment and that is included in the frequency hopping pattern;

where in Euclidean space, each frequency hopping moment corresponds to a parallel line cluster, each parallel line cluster comprising a plurality of line segments arranged parallel to one another, a first frequency band corresponds to a first line segment of the plurality of line segments, the first line segment comprises a first point and a second point, the first apparatus corresponds to the first point in the Euclidean space and the second apparatus corresponds to the second point in the Euclidean space.

12. The non-transitory computer-readable storage medium according to claim 11, wherein the first indication information comprises one or more of:

identification information of the frequency hopping pattern; or the frequency hopping pattern.

13. The non-transitory computer-readable storage medium according to claim 11, wherein the frequency hopping pattern comprises a signature sequence.

14. The non-transitory computer-readable storage medium according to claim 13, wherein a frequency band granularity of the signature sequence is of a resource block level or of a resource element level.

15. The non-transitory computer-readable storage medium according to claim 11, wherein a granularity of the frequency hopping pattern in time domain is one of:

one or more orthogonal frequency-division multiplexing (OFDM) symbols, or one or more slots.

\*    \*    \*    \*    \*